US011893947B2

(12) United States Patent
Lee et al.

(10) Patent No.: US 11,893,947 B2
(45) **Date of Patent: *Feb. 6, 2024**

(54) DISPLAY DEVICE, AND METHOD OF OPERATING A DISPLAY DEVICE

(71) Applicant: Samsung Display Co., Ltd., Yongin-Si (KR)

(72) Inventors: Jaehoon Lee, Seoul (KR); Deokho Kang, Hwaseong-si (KR); Jong Wook Kim, Seoul (KR); Youngwoon Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,299

(22) Filed: Mar. 9, 2023

(65) Prior Publication Data

US 2023/0230548 A1 Jul. 20, 2023

Related U.S. Application Data

(63) Continuation of application No. 17/307,004, filed on May 4, 2021, now Pat. No. 11,636,813.

(30) Foreign Application Priority Data

May 6, 2020 (KR) ........................ 10-2020-0053776

(51) Int. Cl.
*G09G 3/3275* (2016.01)

(52) U.S. Cl.
CPC ... *G09G 3/3275* (2013.01); *G09G 2320/0233* (2013.01); *G09G 2330/021* (2013.01)

(58) Field of Classification Search
CPC ......... G09G 3/3275; G09G 2320/0233; G09G 2330/021
See application file for complete search history.

(56) References Cited

U.S. PATENT DOCUMENTS 11,636,813 B2 * 4/2023 Lee .......................... G09G 3/20 345/690
2012/0038684 A1 2/2012 Ryu
2013/0129214 A1 5/2013 Toda
2014/0198091 A1 7/2014 Shin et al.
2014/0354710 A1 12/2014 Jun et al.

FOREIGN PATENT DOCUMENTS

KR 10-1542044 B1 8/2015
KR 10-1769120 B1 8/2017
KR 10-2057642 B1 12/2019
KR 10-2020-0015292 A 2/2020

* cited by examiner

*Primary Examiner* — Matthew A Eason
*Assistant Examiner* — Scott D Au
(74) *Attorney, Agent, or Firm* — Innovation Counsel LLP

(57) ABSTRACT

A display device includes a display panel including a plurality of pixels, an image data corrector configured to generate a corrected image data by adjusting an image data and a data driver providing data signals to the plurality of pixels based on the corrected image data. The image data corrector divides the display panel into a plurality of unit areas, and adjust the image data for a unit area among the plurality of unit areas by using a full image load for the entire display panel, a first image load for the unit area, and a second image load for peripheral unit areas surrounding the unit area among the plurality of unit areas.

17 Claims, 5 Drawing Sheets

DISPLAY DEVICE, AND METHOD OF OPERATING A DISPLAY DEVICE

CROSS-REFERENCE TO RELATED APPLICATION(S)

This application is a continuation application of U.S. patent application Ser. No. 17/307,004 filed on May 4, 2021, which claims priority under 35 USC § 119 to Korean Patent Application No. 10-2020-0053776, filed on May 6, 2020 in the Korean Intellectual Property Office (KIPO), the disclosures of which are incorporated herein in their entirety by reference.

BACKGROUND

1. Field

Exemplary embodiments of the present inventive concept relate to a display device, and more particularly to a display device capable of reducing power consumption and a method of operating the display device.

2. Description of the Related Art

Recently, various flat panel display devices capable of reducing the weight and volume than a cathode ray tube have been developed. Examples of the flat panel display include a liquid crystal display device, a field emitting display device, a plasma display device, and an organic light emitting display device.

The organic light emitting display device may display an image using an organic light emitting diode that generates light by recombination of electrons and holes. The organic light emitting display device has a fast response speed and is driven with low power consumption. In addition, the organic light emitting display device is attracting attention because it has excellent emitting efficiency, luminance, and viewing angle.

The organic light emitting display device includes a plurality of data lines and a plurality of scan lines. The organic light emitting display device includes a pixel portion including a plurality of pixels each formed in a region where the data lines and the scan lines cross. In addition, a first voltage and a second voltage are applied to the pixel portion to provide a predetermined voltage to an anode electrode and a cathode electrode of the organic light emitting diode provided in each of the pixels.

When the organic light emitting display device displays a high-brightness image, a large amount of current flows to the pixels constituting the pixel portion. In the case of displaying the high-brightness image, a large amount of current flows through the pixel, and a large load may be applied to the power supply for providing the first voltage and the second voltage. In this case, a problem arises in that power consumption of the organic light emitting display device increases. Also, the performance of the organic light emitting display device may be degraded due to heat generation.

In the conventional case, in order to solve the above problem, a method of limiting the maximum current flowing through the pixel is used to maintain the maximum current less than a predetermined threshold.

However, the conventional method has a disadvantage in that it cannot solve the problem of increasing power consumption because a large amount of current is applied only to pixels in a specific region of the pixel portion.

SUMMARY

Some exemplary embodiments provide a display device capable of reducing power consumption.

Some exemplary embodiments provide a method of operating a display device capable of reducing power consumption.

According to exemplary embodiments, there is provided a display device including a display panel including a plurality of pixels, an image data corrector configured to generate a corrected image data by adjusting an image data and a data driver providing data signals to the plurality of pixels based on the corrected image data. The image data corrector divides the display panel into a plurality of unit areas, and adjust the image data for one unit area among the plurality of unit areas by using a full image load for the entire display panel, a first image load for the one unit area, and a second image load for peripheral unit areas surrounding the one unit area among the plurality of unit areas.

In exemplary embodiments, the image data corrector may include a luminance calculator which calculates the full image load, the first image load and the second image load.

In exemplary embodiments, the luminance calculator may include a full image load calculator configured to calculate the full image load, a first image load calculator configured to calculate the first image load and a second image load calculator unit that calculates the second image load.

In exemplary embodiments, the full image load calculator may calculate the full image load by dividing a current display panel luminance corresponding to the image data for the entire display panel by a maximum luminance corresponding to the image data for the entire display panel.

In exemplary embodiments, the first image load calculator may calculate the first image load by dividing a current unit area luminance corresponding to an image data for the unit area by a maximum luminance corresponding to the image data for the unit area.

In exemplary embodiments, the second image load calculator may calculate the second image load by dividing a current peripheral unit area luminance corresponding to the image data for the peripheral unit areas by a maximum luminance corresponding to the image data for the peripheral unit.

In exemplary embodiments, the second image load is an average value of image loads of the peripheral unit areas.

In exemplary embodiments, the image data corrector may further include a luminance controller which determine scaling factors.

In exemplary embodiments, the luminance controller may include a full luminance controller configured to determine a global scaling factor based on the full image load, and adjust a luminance of the image data for the entire display panel by applying the global scaling factor to the image data for the entire display panel and a partial luminance controller configured to determine a local scaling factor based on the first image load and the second image load, and configured to adjust the luminance of the image data for each of the plurality of unit areas by applying the local scaling factor to the image data for each of the plurality of unit areas.

In exemplary embodiments, the partial luminance controller may determine the local scaling factor as a first constant and apply the first constant to the image data for the unit area corresponding to the first image load when the second image load is higher than a preset maximum value. The partial luminance controller may determine the local scaling factor as a second constant smaller than the first constant, and apply the second constant to the image data for the unit area corresponding to the first image load when the second image load is lower than a preset minimum value. The partial luminance controller may determine the local scaling factor as a value between the first constant and the second constant, and apply the second constant to the image data for the unit area corresponding to the first image load when the second image load is between the preset minimum value and the preset maximum value.

In exemplary embodiments, the global scaling factor may be a value between 0 and 1.

In exemplary embodiments, the local scaling factor may be a value between 0 and 1.

According to exemplary embodiments, there is provided a method of operating a display device configured to display an image on a display panel by adjusting a luminance of an image data including calculating a full image load for the entire display panel, dividing the image into a plurality of unit areas, and calculating a first image load for one unit area among the plurality of unit areas and calculating a second image load for peripheral unit areas surrounding the one unit area. The display device adjusts an image data for the one unit area using the full image load, the first image load, and the second image load.

In exemplary embodiments, calculating the full image load may include dividing a current display panel luminance corresponding to an image data for the entire display panel by a maximum luminance corresponding to the image data for the entire display panel.

In exemplary embodiments, after calculating the full image load, may further include determining a global scaling factor based on the full image load and adjusting the luminance of the image data for the entire display panel by applying the global scaling factor to the image data for the entire display panel.

In exemplary embodiments, the global scaling factor may be a value between 0 and 1.

In exemplary embodiments, calculating the first image load may include dividing a current unit area luminance corresponding to the image data for the unit area by a maximum luminance corresponding to the image data for the unit area.

In exemplary embodiments, calculating the second image load may include dividing a current peripheral unit area luminance corresponding to image data for the peripheral unit areas by a maximum luminance corresponding to the image data for the peripheral unit areas.

In exemplary embodiments, after calculating the first image load and the second image load, may further include determining a local scaling factor based on the first image load and the second image load and adjusting the luminance of the image data for each of the plurality of unit areas by applying the local scaling factor to the image data for each of the plurality of unit areas.

In exemplary embodiments, adjusting the luminance of the image data by applying the local scaling factor may include, determining the local scaling factor as a first constant and may apply the first constant to the image data for the unit area corresponding to the first image load when the second image load is higher than a preset maximum value, determining the local scaling factor as a second constant smaller than the first constant, and applying the second constant to the image data for the unit area corresponding to the first image load when the second image load is lower than a preset minimum value, and determining the local scaling factor as a value between the first constant and the second constant, and applying the second constant to the image data for the unit area corresponding to the first image load when the second image load is between the preset minimum value and the preset maximum value.

In exemplary embodiments, the local scaling factor may be a value between 0 and 1.

In exemplary embodiments, the local scaling factor may from a center portion of the unit area to an edge portion of the unit area changes gradually.

As described above, the display device according to exemplary embodiments of the present inventive concept may include a display panel and an image data corrector. The image data corrector divides the display panel into a plurality of unit areas, and adjust the image data for one unit area among the plurality of unit areas by using a full image load for the entire display panel, a first image load for the one unit area, and a second image load for peripheral unit areas surrounding the one unit area among the plurality of unit areas.

Accordingly, power consumption of the display device may be reduced. Also, heat generation of the display device may be prevented.

BRIEF DESCRIPTION OF THE DRAWINGS

Illustrative, non-limiting exemplary embodiments will be more clearly understood from the following detailed description in conjunction with the accompanying drawings.

DETAILED DESCRIPTION OF THE EMBODIMENTS

Hereinafter, embodiments of the present inventive concept will be explained in detail with reference to the accompanying drawings.

Figure 1:
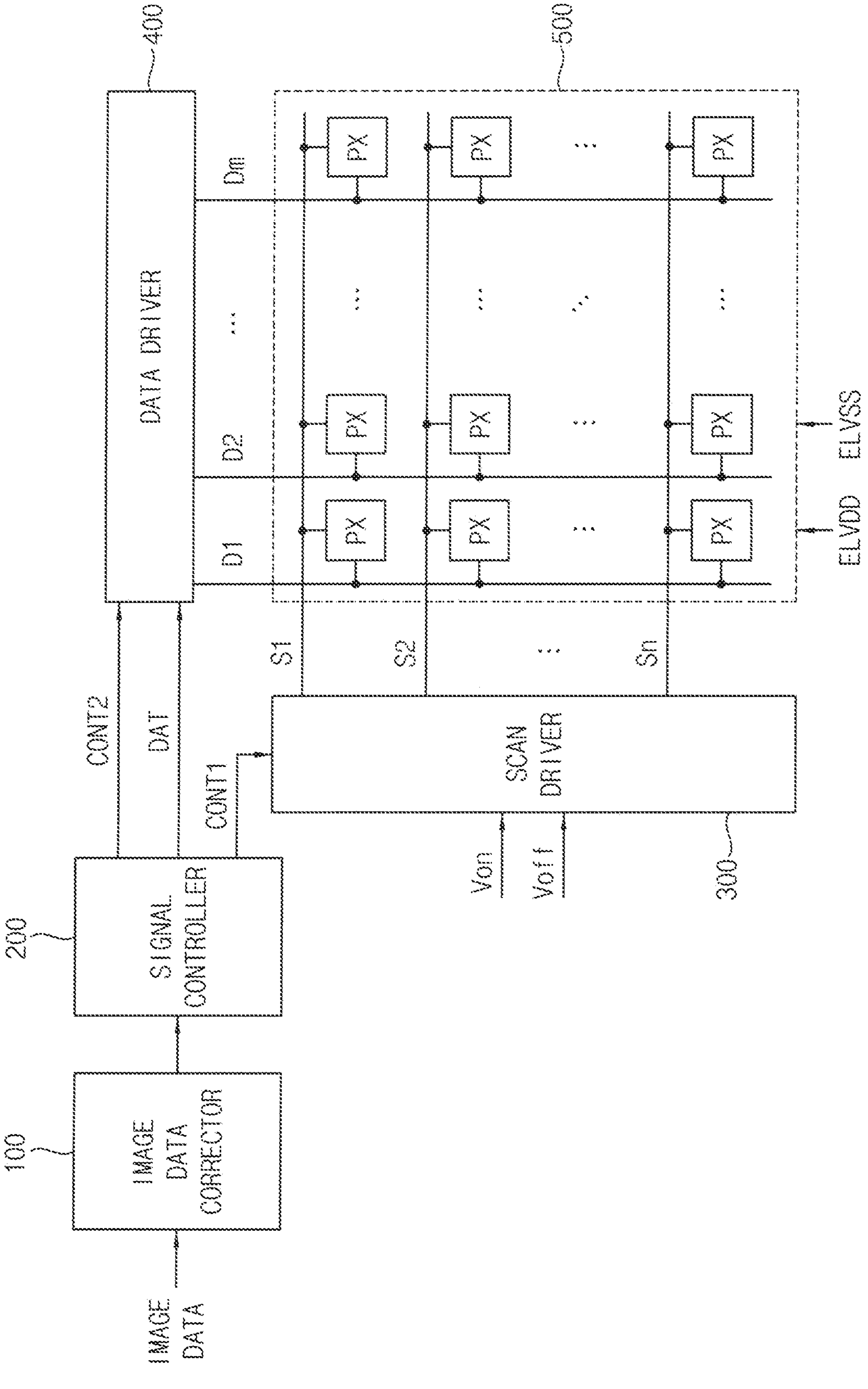
FIG. 1 is a block diagram illustrating a display device according to exemplary embodiments.
Figure 2:
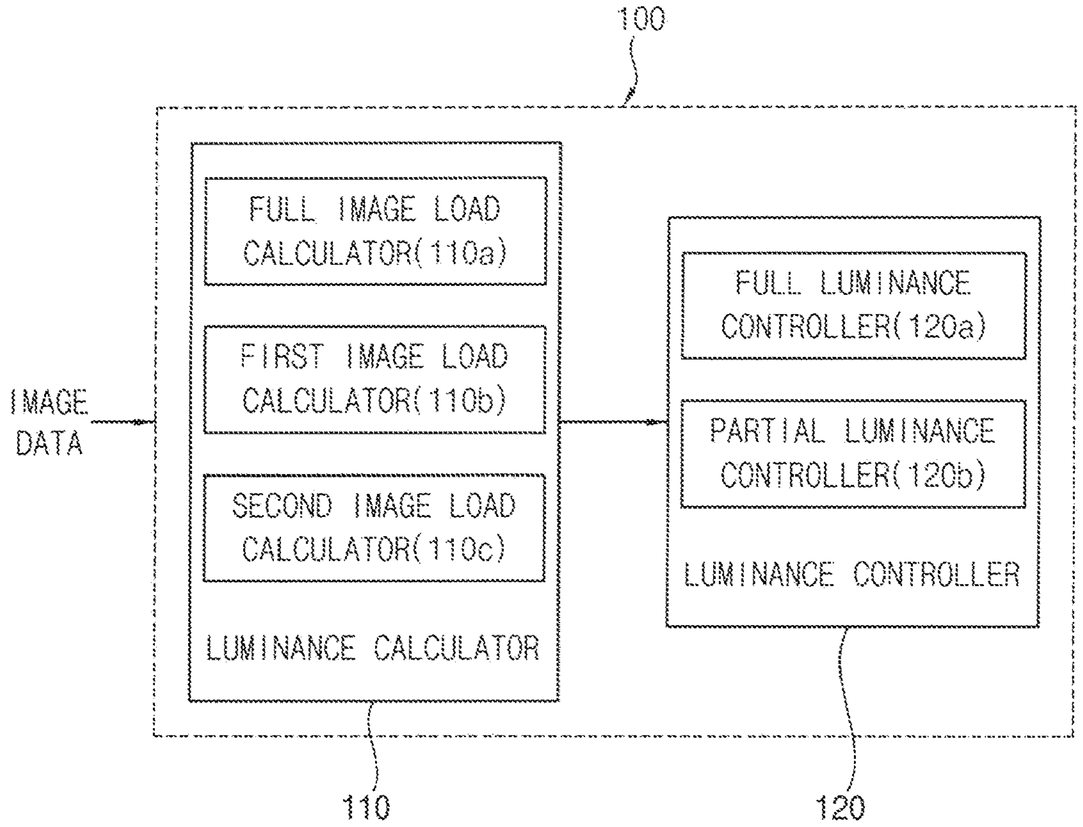
FIG. 2 is a block diagram illustrating an image data corrector according to exemplary embodiments.

FIG. 1 is a block diagram illustrating a display device according to exemplary embodiments, and FIG. 2 is a block diagram illustrating an image data corrector according to exemplary embodiments.

Referring to FIGS. 1 and 2, the display device may include an image data corrector 100, a signal controller 200, a scan driver 300, a data driver 400, and a display panel 500. In an embodiment, the image data corrector 100 may include a luminance calculator 110 and a luminance controller 120. In an embodiment, the luminance calculator 110 may include a full image load calculator 110*a*, a first image load calculator 110*b*, and a second image load calculator 110*c*. In an embodiment, the luminance controller 120 may include a full luminance controller 120*a* and a partial luminance controller 120*b*.

The image data corrector 100 may generate corrected image data by adjusting image data input from an external device. The image data may include information on luminance. The luminance may have a predetermined number of gray scale, for example, 1024, 256, or 64 gray scales. The luminance may be determined according to the gray scale. In an embodiment, the luminance may be determined by data stored in a look up table in which the luminance according to the gray scale is defined. In another embodiment, the luminance may be determined by a gamma curve representing the luminance according to the gray scale.

The full image load calculator 110*a* may calculate a full image load for the entire image of the display panel 500. The image data corrector 100 may divide the display panel 500 into a plurality of unit areas. For example, the image data corrector 100 may divide the display panel 500 into unit areas arranged in a matrix form. The first image load calculator 110*b* may calculate a first image load for a unit area among the plurality of unit areas. The second image load calculator 110*c* may calculate a second image load for peripheral unit areas surrounding the unit area.

In an embodiment, the image load may be calculated based on a current luminance in a certain area and a maximum luminance in the certain area. For example, the image load may be calculated by dividing the current luminance of an area by the maximum luminance of the area. In an embodiment, the full image load calculator 110*a* calculates the full image load by dividing a current display panel luminance corresponding to the image data for the entire display panel 500 by a maximum luminance of the entire display panel 500. Accordingly, the full image load may have a value between 0 and 1. The first image load calculator 110*b* calculates the first image load of a current unit area by dividing a current unit area luminance corresponding to the image data for the current unit areas by a maximum luminance of the current unit area. Accordingly, the first image load may have a value between 0 and 1. The second image load calculator 110*c* calculates the second image load by dividing a current peripheral unit area luminance corresponding to the image data for the peripheral unit areas by a maximum luminance of the peripheral unit areas. Accordingly, the second image load may have a value between 0 and 1.

The full luminance controller 120*a* may determine a global scaling factor based on the full image load. Also, the full luminance controller 120*a* may adjust a luminance of the image data for the entire display panel 500 by applying the global scaling factor to the image data for the entire display panel 500. For example, applying the global scaling factor may be defined as multiplying the image data for the entire display panel 500 by the global scaling factor. In an embodiment, the global scaling factor may be defined as a value for lowering the overall luminance of the display device. The global scaling factor may have a value between 0 and 1 in order to lower the overall luminance of the display device. Through this, the display device may reduce heat generation. Also, the display device may lower power consumption.

The partial luminance controller 120*b* may determine a local scaling factor based on the second image load. Also, the partial luminance controller 120*b* adjusts a partial luminance of the image data by applying the local scaling factor to the image data for each of the plurality of unit areas. That is, the local scaling factor may be applied to the image data for the unit areas corresponding to the second image load. For example, applying the local scaling factor may be defined as multiplying the second image load by the local scaling factor. In an embodiment, the local scaling factor may be defined as a value for lowering partial luminance of the display device. The local scaling factor may have a value between 0 and 1 in order to lower partial luminance of the display device. Through this, the display device may reduce heat generation. Also, the display device may lower power consumption.

In an embodiment, when the second image load is higher than a preset maximum value, the partial luminance controller 120*b* may determine the local scaling factor as a first constant. For example, the first constant may be 1. In this case, the partial luminance controller 120*b* may apply 1 to the image data for the unit area corresponding to the first image load. When the local scaling factor is 1, the image data for the unit area corresponding to the first image load may not be reduced. That is, the luminance of the unit area corresponding to the first image load may not be changed. Through this, it is possible to prevent the luminance of the unit area from lowering more than necessary.

In an embodiment, when the second image load is lower than a preset minimum value, the partial luminance controller 120*b* may determine the local scaling factor as a second constant. The second constant may be smaller than the first constant. In this case, the partial luminance controller 120*b* may apply the second constant to the image data for the unit area corresponding to the first image load. Through this, the partial luminance controller 120*b* may prevent the image data for the unit area corresponding to the first image load from being lowered below a predetermined value. That is, the partial luminance adjusting unit 120*b* may prevent the luminance of the unit area corresponding to the first image load from being lowered below a predetermined value.

In an embodiment, when the second image load is between the preset minimum value and the preset maximum value, the partial luminance controller 120*b* may determine the local scaling factor as a value between the first constant and the second constant, and apply the second constant to the image data for the unit area corresponding to the first image load. In an embodiment, the local scaling factor may linearly increase between the second constant and the first constant. In another embodiment, the local scaling factor may increase in a curved shape between the second constant and the first constant. Through this, the partial luminance controller 120*b* may reduce the image data for the unit area corresponding to the first image load, thereby lowering power consumption of the display device and preventing heat generation of the display device.

For example, when the second image load is 0.8 or more, the partial luminance controller 120*b* may determine and apply the local scaling factor to 0.9 to the image data for a unit area corresponding to the first image load. When the second image load is 0.5 or less, the partial luminance controller 120*b* may apply 0.3 as the local scaling factor to the image data for a unit area corresponding to the first image load. In an embodiment, when the second image load increases from 0.5 to 0.8, the local scaling factor may increase linearly. In another embodiment, when the second image load increases from 0.5 to 0.8, the local scaling factor may increase in a curved shape. However, this is exemplary, and the local scaling factor may be variously determined within a range in which power consumption of the display device can be reduced by adjusting the image data for a unit area corresponding to the first image load.

In another embodiment, when the first image load is smaller than the second image load, the partial luminance controller 120*b* may set the local scaling factor to 1 and apply it to image data of the unit area corresponding to the first image load.

In an embodiment, when the first image load is higher than the second image load, the partial luminance controller 120*b* may apply the local scaling factor to image data of the unit area corresponding to the first image load. In this case, as the first image load is higher than the second image load, the local scaling factor may have a higher value. However, for the visibility of the display device, the local scaling factor may not be lowered below a certain value.

By applying the local scaling factor, the partial luminance of the display panel 500 may be lowered. Accordingly, heat generation of the display device may be prevented and power consumption may be reduced.

The signal controller 200 may receive the corrected image data from the image data corrector 100. The signal controller 200 may appropriately process the corrected image data according to operating conditions of the display panel 500 and the data driver 400. The signal controller 200 may generate a scan control signal CONT1, a data control signal CONT2, and an image data signal DAT. The signal controller 200 may transmit the scan control signal CONT1 to the scan driver 300. The signal controller 200 may transmit the data control signal CONT2 and the image data signal DAT to the data driver 400.

The display panel 500 may include a plurality of pixels PX arranged in a matrix form connected to a plurality of scan lines S1 to Sn and a plurality of data lines D1 to Dm. The scan lines S1 to Sn may extend in a row direction and may be parallel to each other. The data lines D1 to Dm may extend in a column direction and may be parallel to each other. The pixels PX may receive a first power voltage ELVDD and a second power voltage ELVSS from outside.

The scan driver 300 may be connected to the plurality of scan lines S1 to Sn. The scan driver 300 may apply a scan signal to the plurality of scan lines S1 to Sn. The scan signal may include a gate-on voltage Von for applying a data signal to the pixel PX and a gate-off voltage Voff for blocking the data signal according to the scan control signal CONT1. The scan driver 300 may sequentially transmit the scan signal to the pixels PX in response to the scan control signal CONT1 so that the data signal is applied to the pixels PX.

The data driver 400 may be connected to the plurality of data lines D1 to Dm. The data driver 400 may select a gradation voltage according to the image data signal DAT. The data driver 400 may apply the gray voltage selected according to the data control signal CONT2 as the data signal to the plurality of data lines D1 to Dm. The data driver 400 may transmit the corrected image data whose luminance is adjusted by the image data correcting unit 100 to the pixels PX.

Figure 3:
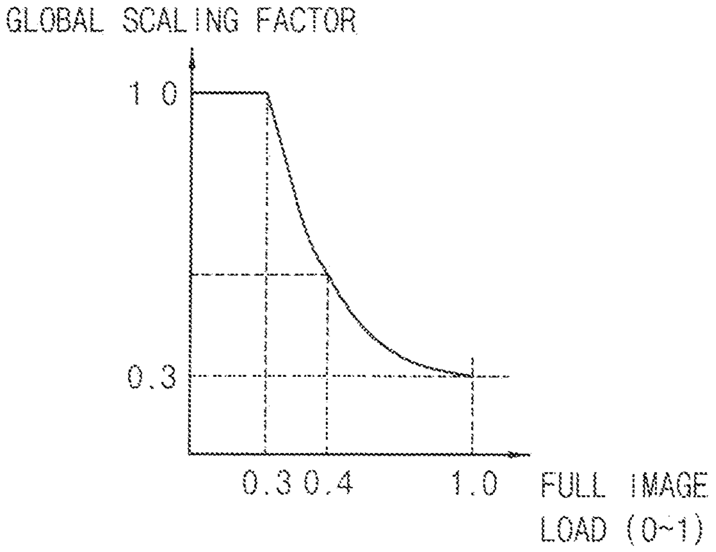
FIG. 3 is a graph illustrating a global scaling factor according to exemplary embodiments.

FIG. 3 is a graph illustrating a global scaling factor according to exemplary embodiments.

Referring to FIGS. 1 and 3, the global scaling factor may be defined as a correction factor for lowering the luminance of the entire display panel 500. For example, when the full image load has a value between 0 and 0.3, the amount of current supplied to the display device may be small. For this reason, the display device may have low power consumption. Accordingly, when the full image load has a value between 0 and 0.3, the global scaling factor may be set to 1 since it is not necessary to lower the power consumption of the display device. As the full image load increases, the amount of current supplied to the display device increases, so that heat generation of the display device increases, and power consumption may increase. When the global scaling factor is applied to the display device, the luminance of the display panel 500 may be lowered. Accordingly, as the value of the full image load increases from 0.3 to 1, the global scaling factor may decrease in order to lower power consumption of the display device. However, the global scaling factor shown in FIG. 3 is exemplary, and values that the global scaling factor can have are not limited thereto.

The global scaling factor may be different according to an operating condition of the display device. In an embodiment, as the full image load increases from 0 to 1, the global scaling factor may decrease in inverse proportion to the full image load.

In another embodiment, the global scaling factor may have a constant value when the full image load increases from 0 to 0.5. When the full image load increases from 0.5 to 1, the global scaling factor may decrease in inverse proportion to the full image load.

In another embodiment, the global scaling factor linearly decreases when the full image load increases from 0 to 0.8, and may be a uniform constant when the full image load increases from 0.8 to 1.

The full luminance controller 120*a* may reduce the luminance of the image data for the entire display panel 500 by applying the global scaling factor to the image data for the entire display panel 500. In an embodiment, the global scaling factor may be a value between 0 and 1.

In this way, the global scaling factor may be variously determined within a range in which heat generation of the display device is prevented by lowering the image data for the entire display panel 500 and power consumption of the display device is reduced.

The global scaling factor may have various values according to the type of the display device. For example, when the display device is a large display device, a large amount of current may be supplied to operate the large display device. Accordingly, when the display device is a large display device, the global scaling factor may have generally large values to reduce an amount of current supplied to the large display device. In another example, when the display device is an organic light emitting display device with high heat generation, the global scaling factor may generally have small values to reduce an amount of current supplied to the organic light emitting display device. In this way, the global scaling factor may be variously determined according to the type and size of the display device.

Also, the global scaling factor may be variously determined according to an operating condition of the display device. In an embodiment, when the full image load increases from 0.3 to 1, the global scaling factor may decrease from 1.0 to 0.3. In another embodiment, when the full image load is small (e.g., when the full image load is less than 0.3), the global scaling factor is a high value (e.g., the global scaling factor approaches 1) for the visibility of the display device. In an embodiment, the global scaling factor may have a lower limit for visibility of the display device. For example, even when the full image load of the display device increases (e.g., the full image load approaches 1), the global scaling factor may be maintained at a value of 0.3 or more.

Figure 4:
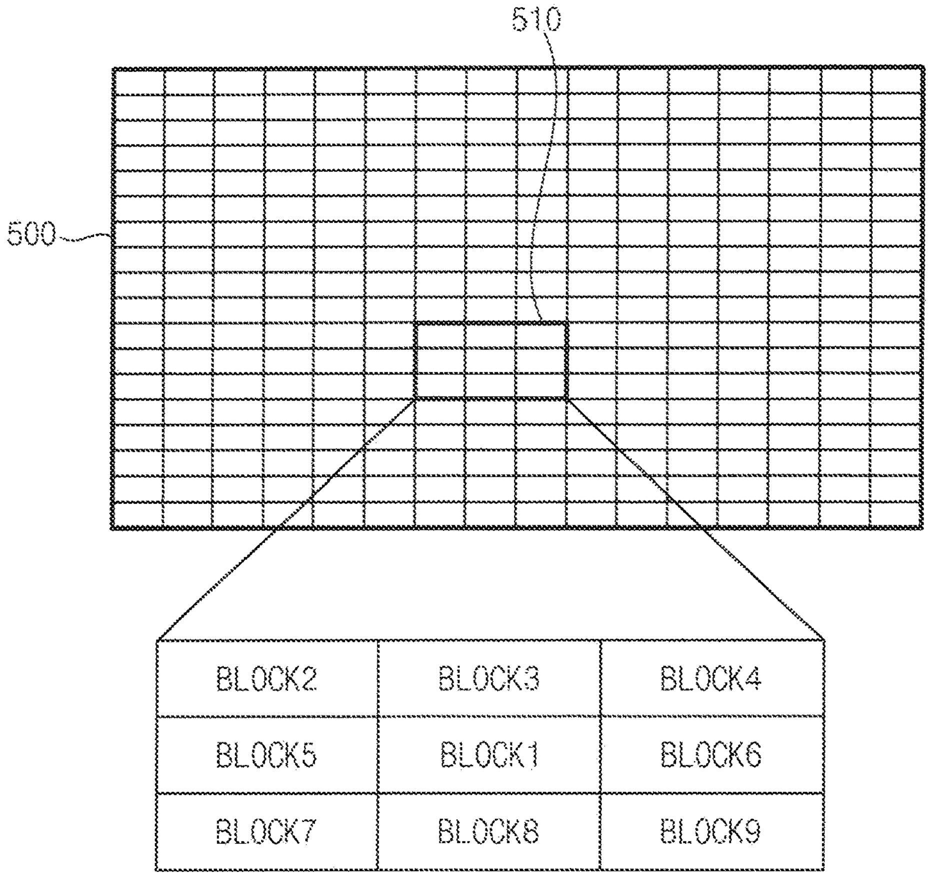
FIG. 4 is a diagram illustrating a unit area and peripheral areas according to exemplary embodiments.

FIG. 4 is a diagram illustrating a unit area and peripheral areas according to exemplary embodiments.

Referring to FIGS. 1, 2 and 4, the image data corrector 100 may divide the display panel 500 into the plurality of unit areas. The image data corrector 100 may select a target area 510 from among the plurality of unit areas to partially control the luminance. The target area 510 may include first to ninth unit areas BLOCK1 to BLOCK9. In an embodiment, the first image load calculator 110*b* may calculate the first image load by dividing the current unit area luminance corresponding to the image data for the first unit area BLOCK1 by a maximum luminance corresponding to the image data for the first unit area BLOCK1. The second image load calculator 110*c* may calculate the second image load by dividing the current peripheral unit area luminance corresponding to the image data for the second to ninth unit areas BLOCK2 to BLOCK9 surrounding the first unit area BLOCK1 by the maximum luminance corresponding to the image data for the second to ninth unit areas BLOCK2 to BLOCK9. In an embodiment, the current peripheral unit area luminance may be an average value of the luminance of the second to ninth unit areas BLOCK2 to BLOCK9. In another embodiment, the current peripheral unit area luminance may be an intermediate value of the luminance of the second to ninth unit areas BLOCK2 to BLOCK9. In FIG. 4, the peripheral unit areas are illustrated as the second to ninth unit areas BLOCK2 to BLOCK9, but the peripheral unit areas are not limited thereto. For example, the peripheral unit areas may be the third, fifth, sixth, and eighth unit areas BLOCK3, BLOCK5, BLOCK6, and BLOCK8.

Figure 5:
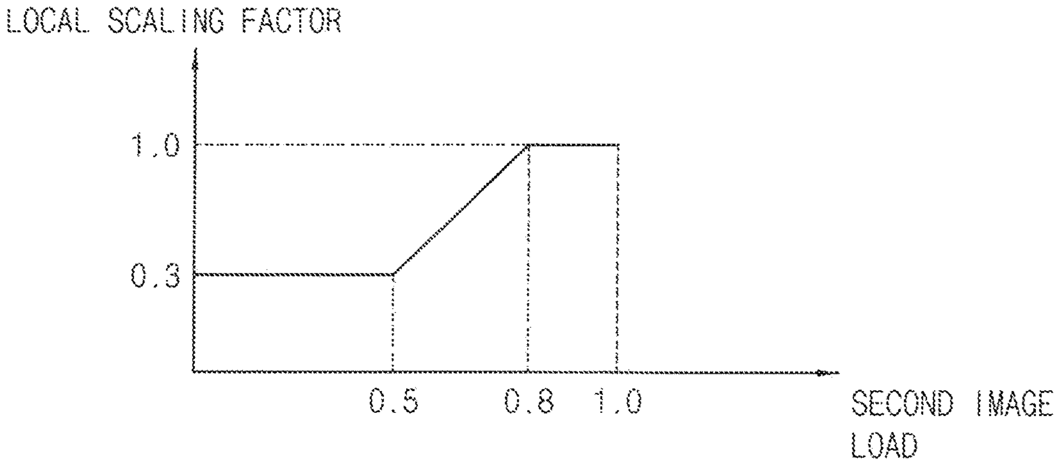
FIG. 5 is a graph illustrating a local scaling factor according to exemplary embodiments.

FIG. 5 is a graph illustrating a local scaling factor according to exemplary embodiments.

Referring to FIGS. 1, 2, 4 and 5, in an embodiment, when the second image load is higher than a preset maximum value, the local scaling factor may be determined as a first constant. For example, when the second image load is 0.8 or more, the first constant may be 1. When the second image load is less than the preset minimum value, the local scaling factor may be determined as a second constant smaller than the first constant. For example, when the second image load is 0.5 or less, the second constant may be 0.3. When the second image load is between the preset minimum value and the preset maximum value, the local scaling factor may be a value between the second constant and the first constant. As illustrated in FIG. 5, as the second image load increases from 0.5 to 0.8, the local scaling factor may linearly increase from 0.3 to 1.

In another embodiment, when the first image load is smaller than the second image load, the partial luminance controller 120*b* may not control the luminance of the first unit area BLOCK1. In other words, the value of the local scaling factor may be 1. When the first image load is larger than the second image load, the partial luminance controller 120*b* may lower the luminance of the first unit area BLOCK1 by applying the local scaling factor to the image data for the first unit area BLOCK1. In other words. When the first unit area BLOCK1 is brighter than the second to ninth unit areas BLOCK2 to BLOCK9, the brightness of the first unit area BLOCK1 may be lowered to lower power consumption of the display device.

Figure 6:
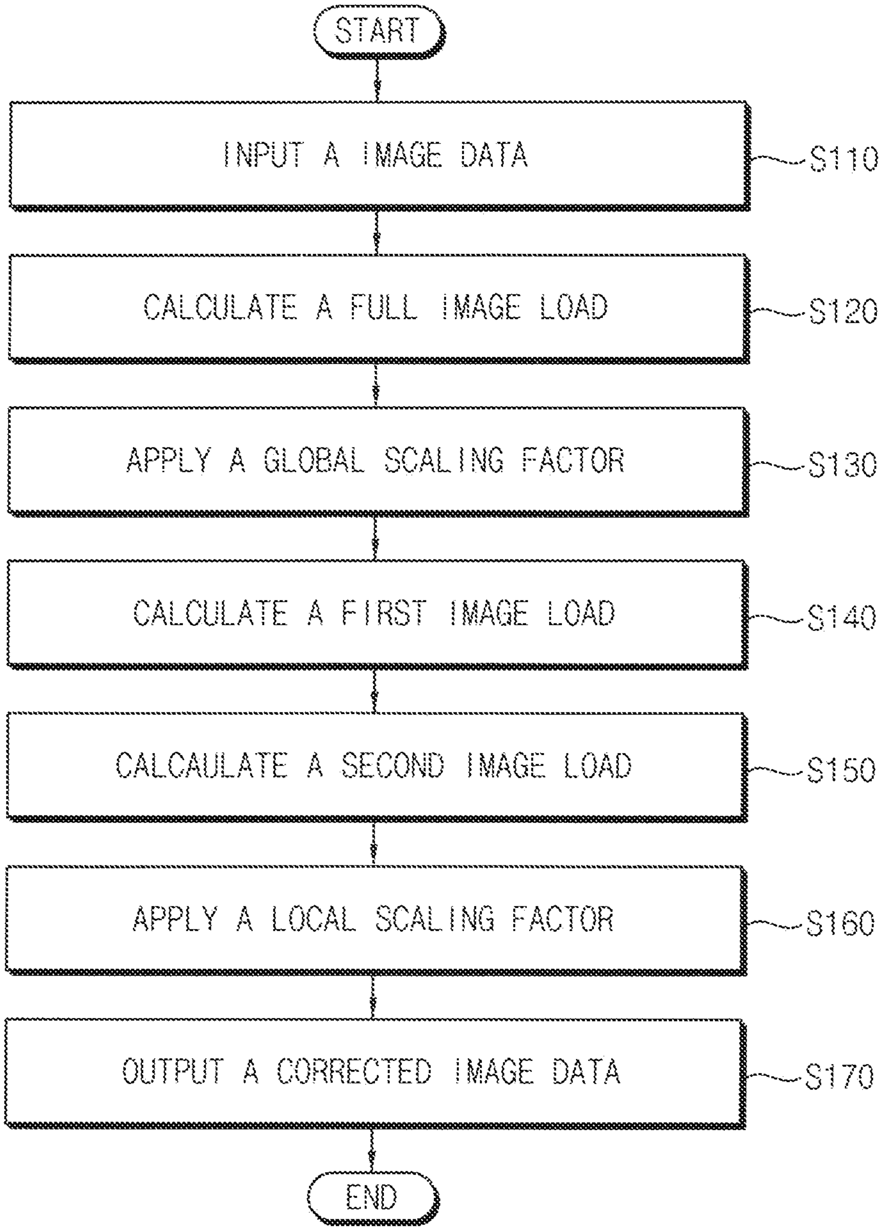
FIG. 6 is a flowchart illustrating a method of operating a display device according to exemplary embodiments.

FIG. 6 is a flowchart illustrating a method of operating a display device according to exemplary embodiments.

Referring to FIGS. 1, 2 and 6, in a method of operating a display device according to an exemplary embodiment of the present inventive concept, the image data may be input to the display device to the image data corrector 100 (S110). The image data may be corrected by the image data corrector 100. In an embodiment, the image data corrector 100 may control the luminance of the image data. The image data corrector 100 may include the luminance calculator 110 and the luminance controller 120.

The full image load calculator 110*a* in the luminance calculator 110 may calculate the full image load for the entire display panel 500 (S120). The full image load may have a value between 0 and 1. When the value of the full image load is large, the overall luminance of the display panel 500 may be high. In this case, the amount of current provided to the display device may be large. Accordingly, a problem such as heat generation may occur in the display device. Also, power consumption of the display device may increase. The full luminance controller 120*a* may apply the global scaling factor to the image data for the entire display panel 500 (S130). Through this, the full luminance controller 120*a* may control the overall luminance of the display panel 500. The global scaling factor may decrease as the full image load increases. Accordingly, it is possible to reduce the power consumption of the display device by preventing an overcurrent from being provided to the display panel 500. In addition, damage to the display device due to heat generation may be prevented.

The first image load calculator 110*b* may divide the display panel 500 into the plurality of unit areas, and calculate the first image load for a unit area among the plurality of unit areas (S140). The first image load may have a value between 0 and 1. The second image load calculator 110*c* may calculate the second image load for peripheral unit areas surrounding the unit area (S150). The second image load may have a value between 0 and 1.

The partial luminance controller 120*b* may apply the local scaling factor to the image data for the first image load (S160). In an embodiment, when the second image load is equal to or greater than the preset maximum value, the local scaling factor may be 0.9. For example, when the second image load is 0.7 or more, the local scaling factor may be 0.9. When the second image load is less than the preset minimum value, the local scaling factor may be a uniform constant. For example, when the second image load is 0.3 or less, the local scaling factor may be 0.5. When the second image load is between the preset minimum value and the preset maximum value, the local scaling factor may be a value between the constant and 0.9. For example, as the second image load increases from 0.3 to 0.7, the local scaling factor may have a value linearly increasing from 0.5 to 0.9.

In an embodiment, the local scaling factor may be gradually changed in the unit area. For example, the local scaling factor from a center portion of the unit area to an edge portion of the unit area may be change gradually. Through this, the image data between the center portion and the edge may be gradually controlled to improve visibility of the display device.

Figure 7:
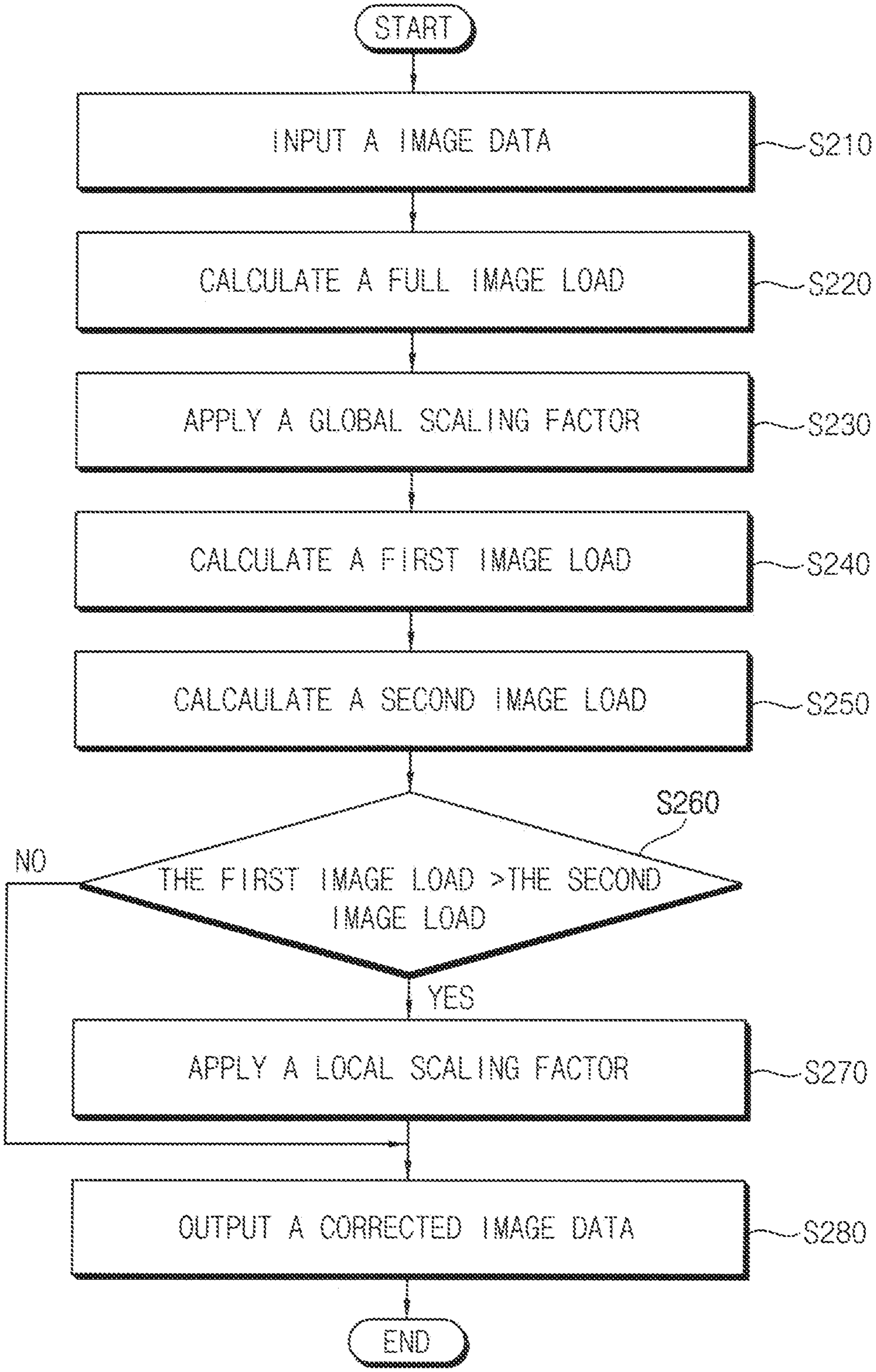
FIG. 7 is a flowchart illustrating a method of operating a display device according to exemplary embodiments.

FIG. 7 is a flowchart illustrating a method of operating a display device according to exemplary embodiments.

Referring to FIGS. 1, 2 and 7, in a method of operating a display device according to an exemplary embodiment of the present inventive concept, the image data may be input to the display device to the image data corrector 100 (S210). The image data may be corrected by the image data corrector 100. In an embodiment, the image data corrector 100 in the luminance calculator 110 may control the luminance of the image data. The image data corrector 100 may include the luminance calculator 110 and the luminance controller 120.

The full image load calculator 110*a* may calculate the full image load for the entire display panel 500 (S220). The full image load may have a value between 0 and 1. When the value of the full image load is large, the overall luminance of the display panel 500 may be high. In this case, the amount of current provided to the display device may be large. Accordingly, a problem such as heat generation may occur in the display device. Also, power consumption of the display device may increase.

The full luminance controller 120*a* may apply the global scaling factor to the image data for the entire display panel 500 (S230). Through this, the full luminance controller 120*a* may control the overall luminance of the display panel 500. The global scaling factor may decrease as the full image load increases. Accordingly, it is possible to reduce the power consumption of the display device by preventing an overcurrent from being provided to the display panel 500. In addition, damage to the display device due to heat generation may be prevented.

The first image load calculator 110*b* may divide the display panel 500 into the plurality of unit areas, and calculate the first image load for a unit area among the plurality of unit areas (S240). The first image load may have a value between 0 and 1. The second image load calculator 110*c* may calculate the second image load for peripheral unit areas surrounding the unit area (S250). The second image load may have a value between 0 and 1.

The partial luminance controller 120*b* may compare the first image load and the second image load (S260). In an embodiment, when the first image load is smaller than the second image load, the partial luminance controller 120*b* may not apply the local scaling factor to the image data for the first image load. In an embodiment, when the first image load is greater than the second image load, the partial luminance controller 120*b* may apply the local scaling factor to the image data for the first image load (S270). Accordingly, the luminance of the first image load is lowered, so that power consumption of the display panel 500 may be reduced.

Accordingly, the corrected image data may be output (S280). The corrected image data may be data to which the global scaling factor and the local scaling factor are applied to the image data.

In this way, heat generation of the display device may be reduced by applying the global scaling factor and the local scaling factor to the image data, and power consumption of the display device may be reduced. When only the global scaling factor is applied, it may not be possible to partially reduce power consumption and prevent heat generation of the display device. According to the present inventive concept, after applying the global scaling factor, the local scaling factor is additionally applied to reduce partial power consumption and prevent heat generation of the display device.

The inventive concepts may be applied to any display device, and any electronic device including the display device. For example, the inventive concepts may be applied to a mobile phone, a smart phone, a tablet computer, a wearable electronic device, a virtual reality (VR) device, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A display device comprising:

a display panel including a plurality of pixels; and an image data corrector generating corrected image data by adjusting the image data, wherein the image data corrector divides the display panel into a plurality of unit areas, and adjust the image data for a unit area among the plurality of unit areas by using a full image load for the entire display panel, a first image load for the unit area, and a second image load for peripheral unit areas surrounding the unit area among the plurality of unit areas, and wherein the image data corrector includes:

a full image load calculator calculating the full image load by dividing a current display panel luminance corresponding to the image data for the entire display panel by a maximum luminance corresponding to the image data for the entire display panel;

a first image load calculator calculating the first image load by dividing a current unit area luminance corresponding to an image data for the unit area by a maximum luminance corresponding to the image data for the unit area; and a second image load calculator calculating the second image load by dividing a current peripheral unit area luminance corresponding to an image data for the peripheral unit areas by a maximum luminance corresponding to the image data for the peripheral unit.

2. The display device of claim 1, wherein the image data receives the image data from an external device.

3. The display device of claim 1, wherein the second image load is an average value of image loads of the peripheral unit areas.

4. The display device of claim 1, wherein the image data corrector further includes a luminance controller which determines scaling factors.

5. The display device of claim 4, wherein the luminance controller includes a full luminance controller determining a global scaling factor based on the full image load and adjust a luminance of the image data for the entire display panel by applying the global scaling factor to the image data for the entire display panel, and a partial luminance controller determining a local scaling factor based on the first image load and the second image load, and adjusting the luminance of the image data for each of the plurality of unit areas by applying the local scaling factor to the image data for each of the plurality of unit areas.

6. The display device of claim 5, wherein the partial luminance controller determines the local scaling factor as a first constant and applies the first constant to the image data for the unit area corresponding to the first image load when the second image load is higher than a preset maximum value, the local scaling factor as a second constant smaller than the first constant, and applies the second constant to the image data for the unit area corresponding to the first image load when the second image load is lower than a preset minimum value, and the local scaling factor as a value between the first constant and the second constant, and applies the second constant to the image data for the unit area corresponding to the first image load when the second image load is between the preset minimum value and the preset maximum value.

7. The display device of claim 5, wherein the global scaling factor is a value between 0 and 1.

8. The display device of claim 5, wherein the local scaling factor is a value between 0 and 1.

9. The display device of claim 1, further comprising:

a data driver providing data signals to the plurality of pixels based on the corrected image data.

10. A method of operating a display device which displays an image on a display panel including a plurality of unit areas by adjusting a luminance of an image data, the method comprising:

calculating a full image load for the entire display panel, a first image load for a unit area among the plurality of unit areas, and a second image load for peripheral unit areas surrounding the unit area; and adjusting the luminance of the image data for the unit area using the full image load, the first image load, and the second image load, wherein the full image load is a current luminance corresponding to the image data for the entire display panel divided by a maximum luminance corresponding to the image data for the entire display panel, the first image load is a current unit area luminance corresponding to the image data for the unit area divided by a maximum luminance corresponding to the image data for the unit area, and the second image load is a current peripheral unit area luminance corresponding to the image data for the peripheral unit areas divided by a maximum luminance corresponding to the image data for the peripheral unit areas.

11. The method of claim 10, wherein calculating the full image load includes dividing a current luminance corresponding to the image data for the entire display panel by a maximum luminance corresponding to the image data for the entire display panel.

12. The method of claim 10, after calculating the full image load, further comprising:

determining a global scaling factor based on the full image load; and adjusting the luminance of the image data for the entire display panel by applying the global scaling factor to the image data for the entire display panel.

13. The method of claim 12, wherein the global scaling factor is a value between 0 and 1.

14. The method of claim 10, after calculating the first image load and the second image load, further comprising:

determining a local scaling factor based on the first image load and the second image load; and adjusting the luminance of the image data for each of the plurality of unit areas by applying the local scaling factor to the image data for each of the plurality of unit areas.

15. The method of claim 14, wherein adjusting the luminance of the image data by applying the local scaling factor includes:

determining the local scaling factor as a first constant and applying the first constant to the image data for the unit area corresponding to the first image load when the second image load is higher than a preset maximum value, determining the local scaling factor as a second constant smaller than the first constant, and applying the second constant to the image data for the unit area corresponding to the first image load when the second image load is lower than a preset minimum value, and determining the local scaling factor as a value between the first constant and the second constant, and applying the second constant to the image data for the unit area corresponding to the first image load when the second image load is between the preset minimum value and the preset maximum value.

16. The method of claim 15, wherein the local scaling factor is a value between 0 and 1.

17. The method of claim 16, wherein the local scaling factor from a center portion of the unit area to an edge portion of the unit area changes gradually.

* * * * *